May 15, 1962 TADATAKA NOMURA 3,035,123

PARTY LINE TELEPHONE CIRCUIT

Filed March 13, 1958 3 Sheets-Sheet 1

Tadataka NOMURA
INVENTOR.

BY
Wenderoth, Lind & Ponack
Attys

May 15, 1962 TADATAKA NOMURA 3,035,123

PARTY LINE TELEPHONE CIRCUIT

Filed March 13, 1958 3 Sheets-Sheet 2

Tadataka NOMURA
INVENTOR.

BY
Wenderoth, Lind & Ponack
Attys

May 15, 1962 TADATAKA NOMURA 3,035,123

PARTY LINE TELEPHONE CIRCUIT

Filed March 13, 1958 3 Sheets-Sheet 3

TADATAKA NOMURA

INVENTOR.

BY Wenderoth, Lind & Ponack

ATTORNEYS 3,035,123
PARTY LINE TELEPHONE CIRCUIT

Tadataka Nomura, Room 1, Oe Bldg., 16 Kinugasa-cho, Kita-ku, Osaka City, Japan

Filed Mar. 13, 1958, Ser. No. 721,204
Claims priority, application Japan Mar. 20, 1957
5 Claims. (Cl. 179—17)

This invention relates to telephone systems and more particularly to improvements in the two-party line system telephone circuit.

An object of this invention is to provide in a two-party line system telephone substation circuit a local circuit for securing secrecy of conversation, that is, a circuit for preventing one party from being overheard by the other party on the same party line.

Another object of this invention is to embody the aforesaid circuit in combination with the function of mutual conversation between the two parties.

A further object of this invention is to embody the principles of the same in an automatic telephone set without affecting in any way the transmission efficiency thereof.

A still further object of the invention is to minimize as far as possible the cost and bulk of the component parts so as to make the design of the invention as practicable as possible both from the economic and engineering points of view.

In the local circuit of the present invention for secrecy of conversation are basically employed a high resistance element, a condenser and a relay and the circuit is coupled with the telephone line near the line terminals of each of the substation circuits on the same party line. But the circuit is so designed as to be interconnected with one another so that once a particular substation set on a party line is in talking conditions, it is impossible for the other party to form a telephone circuit even if the handset thereof is lifted from the substation set cradle.

Referring now to a particular party line substation circuit embodying the principles of the invention for secrecy of conversation, a condenser is so connected with the telephone line near the line terminals of said substation circuit as to remain constantly charged by way of a high resistance element with the direct current supplied from the common battery in the telephone exchange during the period when the substation set is in idle position. To said condenser is connected a relay such that the relay is energized by means of the charge released from the condenser when the switchhook contacts are closed by the lifting of the handset connecting the receiver with the transmitter from the station set cradle, and the energized relay is held in operated position by means of the mechanical action of a relay armature latching member, whereby the substation circuit is held in talking conditions independent of the other party on the same party line. To release the relay armature latched in the attracted position to terminate the talking conditions, the electromagnet which is connected with the condenser, the relay and the switchhook is energized either by means of the charge momentarily re-stored in the condenser by way of the transmitter circuit and released from the condenser during the short period when the handset is replaced on the cradle, that is, when the switchhook leaves the closing switchhook contacts and comes into contact with an electromagnet contact confronting one of the switchhook contacts, or by means of the direct current which directly flows into the electromagnet through the transmitter circuit upon completion of contact of the switchhook with said electromagnet contact.

In another embodiment of this invention is employed a polarized relay consisting of a permanent magnet and a single coil surrounding said magnet. Said polarized relay is so connected with the condenser that the polarized relay is energized by means of the discharging current from the condenser passing through the single coil of the relay when the switchhook contact is closed by the lifting of the handset; the energized relay is held in operated position by means of the permanent magnet of the polarized relay; and the restoration of the relay to the normal idle position is performed by means of the direct current charging the condenser via the single coil of said relay upon the releasing of the switchhook to the normal idle position.

Mutual conversation, on the other hand, is performed by means of a twin contact switch element having one contact in the ringer circuit and another in the lower line conductor in shunt with a small capacity condenser. When one particular party on a party line wants to call the other party on the same party line, said party lifts the handset from the cradle, dials the other party's number and disconnects the ringer and transmitter circuits by means of the twin contact switch. Thereupon the small capacity condenser operates as a means to transmit the ringback tone from the called party substation set to the calling party substation set, and the tone is suspended when the called party lifts the handset from the cradle upon receipt of the calling signal. Confirming the suspension of the ring back tone the calling party restores the twin contact switch element to the normal closing position, and the normal speech current flows between the two substation circuits.

In embodying the principles of the invention to the fullest extent there is employed a high resistance element in series connection with the condenser, the resistance value of which is so selected as to be high enough to delay the charging of the condenser of the non-calling party on the same party line when a particular substation set is in the break period of dialling operation, whereby the function of secrecy of conversation is ensured even in the break period. Impulse distortions which may be occasioned during the dialling period by the lifting of the handset on the same party line other than the calling party's are also eliminated by means of the high resistance element. The value of the high resistance element is computed in terms of supply voltage from the telephone exchange, relay energizing current and the capacitance of the condenser. When one more additional resistance element is employed in the relay circuit, the volume of the charge released from the condenser is easily controllable.

Thus the basic feature of the present invention is in the specific employment of the charging and discharging properties of the condenser. The circuit is so designed that the completion of a telephone circuit or talking conditions in one particular substation circuit automatically locks out the substation of the other party circuit on the same party line.

Another feature of the invention is the employment of the high resistance element to delay the charging of the condenser of the non-calling party when the calling party on the same party line is in the dialing operation.

Another feature of the invention is the employment of the polarized relay in connection with the condenser.

Another feature of the invention is that the transmission efficiency is affected in no way. No additional burden is imposed upon the telephone circuit, as the relay, once energized, is held in operated position by means of a mere mechanical action of the relay armature latching member or of the permanent magnet equipped in the polarized relay.

Another feature of the invention is that a uniform efficiency of secrecy of conversation and mutual conversation is ensured over a wide range of distance. Limitations or shortcomings due to the distance of telephone line are all eliminated by means of the condenser installed in the substation set.

A still another feature of the invention is installation advantages. The local circuit is so designed that the line construction is confined to the branch system, requiring no extra lines between the substation sets.

A further feature of the invention is that the local circuit thereof is so intrinsically coupled with the substation circuit that the design is operated by a mere lifting and replacing of the handset, and a single twin contact switch element.

A still further feature of the invention is that the design is so deviced as to be connected as a single, independent unit to the existing telephone set.

Other objects and features of the invention may be understood from a consideration of the following disclosure when read in accordance with the attached drawings in which.

Figure 1:
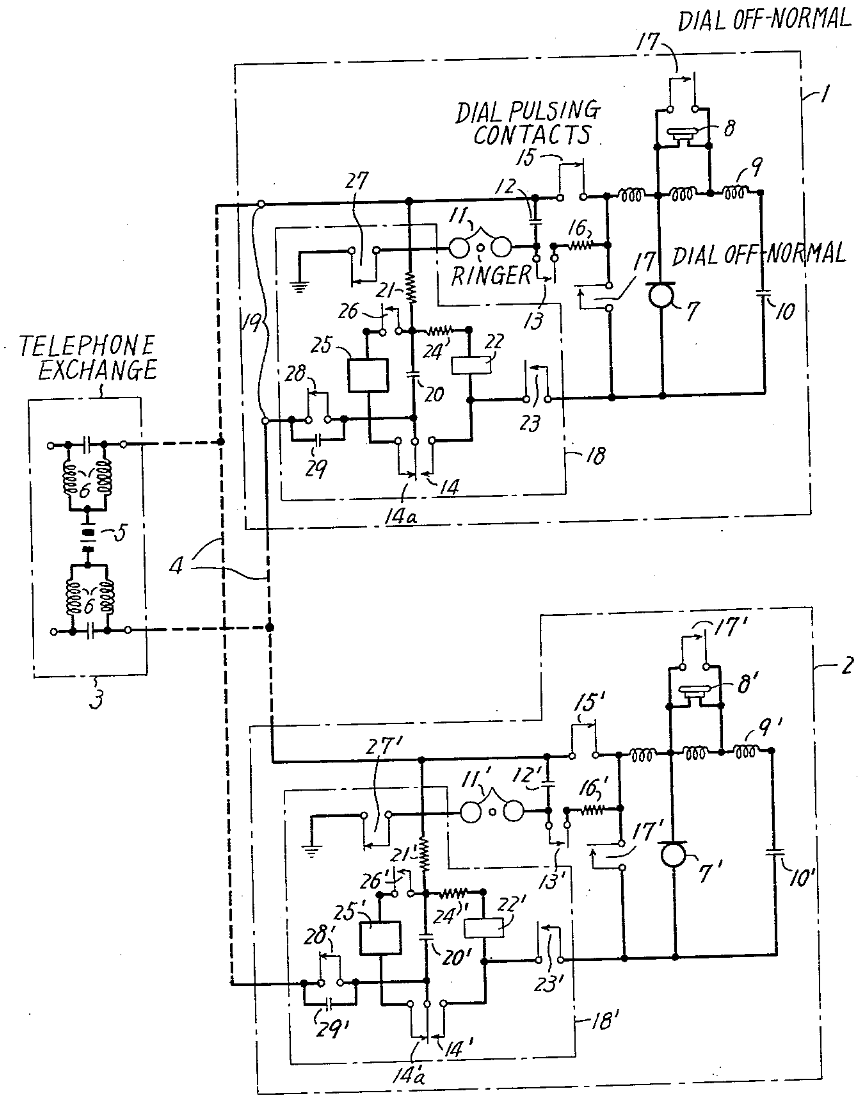
FIGURE 1 is a schematic diagram of a telephone circuit embodying on a two-party line the principles of the invention in shunt connection with the telephone line.

Referring now to FIGURE 1, wherein the principles of the invention are embodied on a two-party line telephone circuit, the party line telephone substation circuits 1 and 2 are connected in opposite directions to a telephone exchange 3 by a telephone line 4. The common direct current supply at the telephone exchange 3 is illustratively shown by battery 5 and battery supply coils 6. The substation circuit 1 comprises transmitter 7 and receiver 8 connected with one another by windings 9 and a condenser 10. A grounded ringer 11 is coupled with the upper line conductor by a condenser 12. A switchhook contact 13 is provided in the ringer circuit and another switchhook contact 14 in the lower line conductor. The dial circuit is represented by dial pulsing contacts 15, a resistance element 16 and dial off-normal contacts 17. All these component parts comprising the substation circuit 1 are provided in the same manner in the substation circuit 2, wherein the component parts are all similarly numbered and provided with a single prime to differentiate, and the arrangement and operation thereof are so well known in the art that detailed reference will be confined to the circuit 18 embodying the principles of the present invention.

The circuit 18 in the substation circuit 1 is connected in shunt with the telephone line near the line terminals 19, comprising a condenser 20 connected with a high resistance element 21 across the line, a relay 22 having a contact 23 disconnecting the lower line conductor and coupled with said condenser 20 by another resistance element 24, and an electromagnet 25 also coupled with said condenser 20 by another relay contact 26 and with the lower line conductor by a contact 14*a* confronting the switchhook contact 14. The same component parts are also provided in the same manner in the substation circuit 2, wherein said components parts are all similarly numbered and provided with a single prime to differentiate.

The operation of the circuit 18 and 18' on the same party line is based upon the specific employment of the charging and discharging properties of the condensers 20 and 20'. When the handset connecting the transmitter 7 with the receiver 8 is lifted from the substation set cradle and the switchhook contacts 13 and 14 are closed, the relay 22 is energized and the relay contacts 23 and 26 are also closed, the energization being conducted by means of the charge released from the condenser 20 which remains charged with the current supplied from the telephone exchange 3 via the high resistance element 21 while the substation set 1 is in idle position, and the energized relay is held in operated position by means of a mere mechanical latching of relay contacts 23 and 26, whereby the substation circuit 1 is held in talking condition. The circuit 18' in the substation circuit 2 also operates in the same manner.

The condensers 20 and 20' however are so connected with one another that the completion of a telephone circuit or talking conditions in the substation set 1 automatically locks out the substation circuit 2, even if the handeset thereof is lifted, and the contacts 23 and 26 held in attracted position are released by means of electromagnetic force when the handset is replaced to the cradle. The condenser 20 is charged with the current coming through the transmitter circuit from the telephone exchange 3 when the switchhook leaves the switchhook contact 14, and the charge is released from the condenser when the switchhook comes into contact with the electromagnet contact 14*a* confronting the switchhook contact 14, so that the electromagnet 25 is energized by the released charge and the contacts 23 and 26 are released from the closing position to terminate the talking conditions. The electromagnet 25' in the substation circuit 2 also operates in the same manner.

The local circuit of the invention for providing secrecy of conversation is so designed as to operate to permit mutual conversation between the two parties. Referring again to FIGURE 1, a twin contact switch element is provided in the circuit 18 having one contact 27 in the ringer circuit and another contact 28 in the lower line conductor in shunt connection with a small capacity condenser 29. The same component parts are also employed in the same manner in the substation circuit 2.

In carrying mutual conversation into effect between the substation circuits 1 and 2, the subscriber 1 for instance, lifts the handset from the cradle, dials the particular number, and opens contacts 27 and 28 by means of the twin contact switch element to hold the substation circuit 1 in suspense for a moment. Upon receipt of the calling signal, the called party 2 lifts the handset from the cradle, and a telephone circuit is completed in the substation circuit 2. The substation circuit 1 is kept open by means of the contact 28 disconnecting the lower line conductor of the substation circuit 1, and the relay 22' is energized by means of the charge released from the condenser 20'. At the same time, the ringback tone which has been transmitted to the substation 1 by way of the condenser 29 shunting the contact 28 in the lower line conductor is now suspended. Confirming the suspension of the tone, the calling party 1 returns the disconnecting contacts 27 and 28 to the normal closing position by means of the twin contact switch element, and the speech current is allowed to flow between the two substation circuits 1 and 2 on the normal speech level. The twin-contact switch element and the small capacity condenser in the substation circuit 2 also operate in the same manner for the same purpose.

The high resistance element 21 is included to delay the charging of the condenser 20' so as to prevent the substation set 2 from forming a telephone circuit when the substation set 1 is in the break period of dialling operation. Impulse distortions occasioned by the lifting of the handset of the substation set 2 while the substation set 1 is in dialling operation are also thereby prevented. The high resistance element 21' in the substation circuit 2 is also employed for the same purposes. The element 24 is included so as to easily control the volume of the charge released from the condenser 20. The element 24' is also employed for the same purpose.

Figure 2:
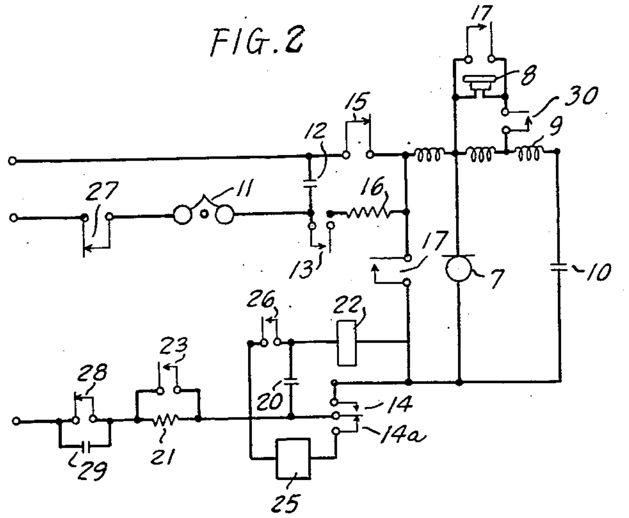
FIGURE 2 is another diagram of a party line substation circuit embodying the principles of the invention in series connection with the telephone line.

In FIGURE 2 is illustrated another embodiment of the local circuit of the invention in series connection with the telephone line near the line terminals. The relay contact 23 is coupled with the high resistance element 21 in the lower line conductor so as to short-circuit the element 21 when the contact 23 is closed. To prevent cross talk, another relay contact 30 is provided in the receiver circuit, whereby the receiver circuit is held in open position during the period when the telephone set is in idle position. The circuit and its component parts, although arranged in a different manner, operate essentially in the same manner as shown in FIGURE 1.

Figure 3:
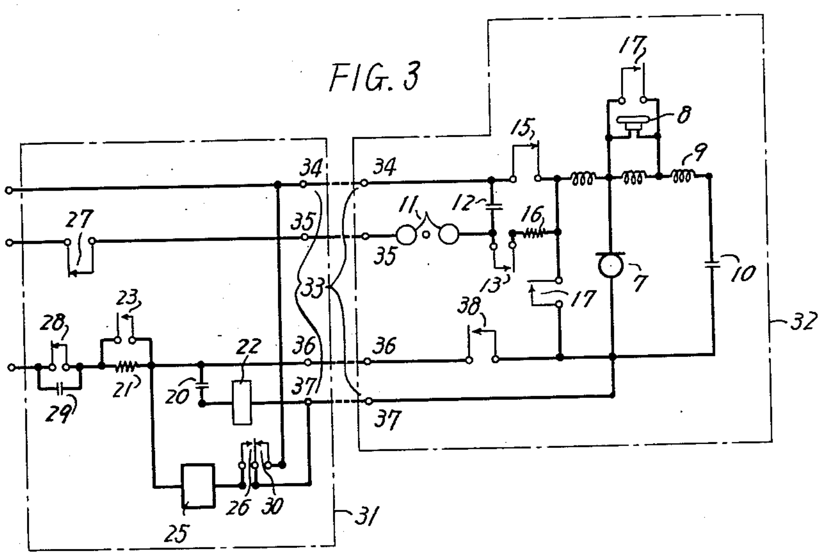
FIGURE 3 is a schematic diagram showing a manner in which the design of the present invention is connected as a separate, independent unit to the ordinary automatic telephone set by means of a four-way flexible cord.

In FIGURE 3 is disclosed a manner in which a design of the present invention including a condenser 20, a high resistance element 21, a relay 22, an electromagnet 25, a twin contact switch element having contacts 27 in the ringer circuit and 28, in the transmission circuit, and a small capacity condenser 29 shunting the contact 28 in the transmission circuit is connected as a separate, independent unit 31 to the ordinary telephone set 32 by means of a four-way flexible cord 33 at the line terminals 34, 35, 36 and 37. The electromagnet 25 is so arranged as to be short-circuited by the closing switchhook contact 38 in the telephone circuit 32 when the relay contact 26 is closed at the outset of the talking conditions, and to be directly energized by the current supplied from the telephone exchange when the switchhook contact 38 is opened at the termination of the talking conditions. The relay contact 26 in the electromagnet circuit is arranged so as to form a transfer or change-over contact with the contact 30 which is employed to short-circuit the receiver 8.

Figure 4:
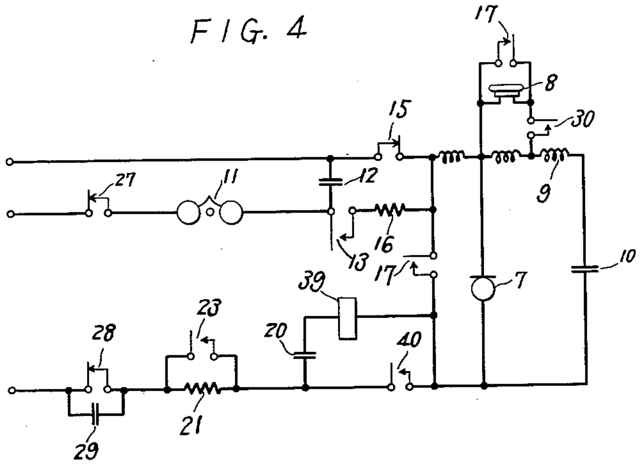
FIGURE 4 is another schematic diagram of the principles of this invention employing a polarized relay instead of the non-polarized relay and the electromagnet.

In FIGURE 4 is illustrated another embodiment of the principles of this invention. Instead of the non-polarized relay and the electromagnet employed in the circuits of FIGURES 1 to 3, a polarized relay 39 consisting of a permanent magnet and a single coil surrounding said magnet is employed in the instant circuit in such a manner that the relay 39 is energized to establish talking conditions by means of the current discharged from the condenser 20, and the energized relay 39 is restored to the normal idle position by means of the current charging the condenser 20 at the termination of the talking conditions, the relay 39 being held in operated position by means of the permanent magnet of said relay. In more detail, the polarized relay 39 is connected in series with the condenser 20, both to be short-circuited by a switchhook contact 40. The current discharged momentarily from the condenser 20, when the switchhook contact 40 is closed by the lifting of the handset, flows into the single coil of the relay 39, so that the resulting combined effect of the magnetic force attracts the armature of the relay 39 to establish talking conditions, and the armature is held in attracted position by means of the permanent magnet of the relay 39 during the talking conditions. When the switchhook contact 40 is released by restoring the handset to the cradle, on the other hand, the direct current from the supply source flows momentarily through the single coil of the relay 39 to charge the condenser 20, so that the resulting reduced effect of the magnetic force releases the armature in attracted position to the normal idle position, thereby terminating the talking conditions. Thus the circuit of the instant embodiment is much simplified as compared with the circuits of FIGURES 1 to 3, but the function of the instant circuit is essentially the same with that of the circuit shown in FIGURE 2.

Figure 5:
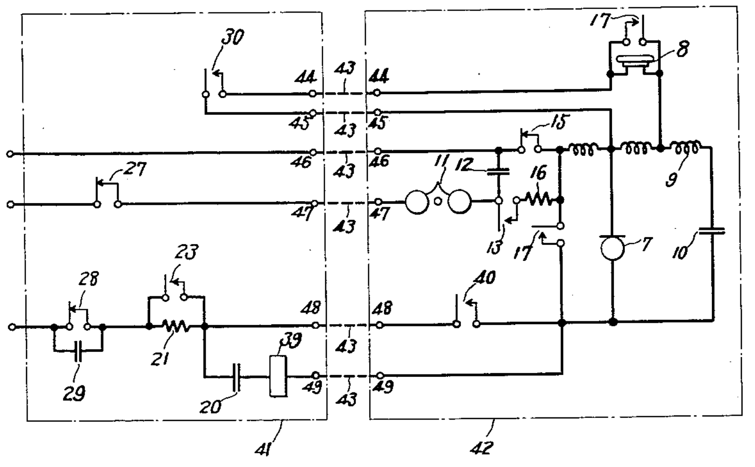
FIGURE 5 is still another schematic diagram showing a manner in which the circuit as shown in FIGURE 4 is connected as a separate, independent unit to the ordinary automatic telephone set by means of a 6-way flexible cord.

In FIGURE 5 is shown the circuit of FIGURE 4 connected as a single unit 41 to the ordinary automatic telephone circuit 42 by way of 6-way flexible cord 43 at the line terminals 44, 45, 46, 47, 48 and 49. The function and the modes of operation of the instant circuit 41 are essentially the same as the circuit shown in FIGURE 4.

Although the present invention has been described with reference to specific embodiments, numerous other modifications thereof are possible within the scope and spirit of the invention. The additional resistance element in the relay circuit need not necessarily be employed as shown in FIGURES 2 to 5, because the elimination thereof does not affect in any way the basic operation of the circuit.

I claim:

1. In a party substation telephone circuit for preventing the conversation of one party from being overheard by another party, said circuit having a condenser and an electromagnetic relay actuated by the discharge from the condenser for closing the circuit of the substation, and a ringer circuit, that improvement comprising a high resistance element connected in series with said condenser for retarding the charging of the condenser during the break period of the dialing operation of another substation on the party line, and means in said circuit for permitting a connection between the parties on the party line comprising a normally closed twin contact switch having one contact in the ringer circuit and the other contact between the electromagnetic relay and the other party substation circuits, and a small capacity condenser shunt connected across said other contact, whereby when said contact switch is opened following dialing a ringback tone from another party being called to the said party substation is passed through said small capacity condenser and when said contact switch is closed, normal speech current can flow in the circuit.

2. The improvement as claimed in claim 1 in which the condenser, the electromagnetic relay, said high resistance element and said twin contact switch and small capacity condenser are a separate unit for attachment to an automatic telephone set.

3. In each substation circuit of a multi-party telephone circuit, a local circuit for preventing one party from being overheard by the other parties, said local circuit comprising a condenser, a polarized relay consisting of a permanent magnet and a single coil around said magnet, said relay being connected to said condenser for closing the talking circuit of the substation when energized by the discharge from said condenser and for being restored to the open condition by current flow therethrough to charge the condenser, the permanent magnet of said relay holding said relay in the energized position, and means in said circuit for permitting a connection between the parties on the party line comprising a normally closed twin contact switch having one contact in the ringer circuit and the other contact between the polarized relay and the other party substation circuits, and a small capacity condenser shunt connected across said other contact, whereby when said contact switch is opened following dialing a ringback tone from another party being called to the said party substation is passed through said small capacity condenser and when said contact switch is closed, normal speech current can flow in the circuit.

4. A local circuit as claimed in claim 3 in the form of a separate unit for connection to an automatic telephone set.

5. In a party substation telephone circuit for preventing the conversation of one party from being overhead by another party, said circuit having a condenser, and an electromagnetic relay actuated by the discharge from the condenser for closing the circuit of the substation, and a ringer circuit, that improvement comprising means in said circuit for permitting a connection between the parties on the party line comprising a normally closed twin contact switch having one contact in the ringer circuit and the other contact between the electromagnet relay and the other party substation circuits, and a small capacity condenser shunt connected across said other contact, whereby when said contact switch is opened following dialing a ringback tone from another party being called to the said party substation is passed through said small capacity condenser and when said contact switch is closed, normal speech current can flow in the circuit.

References Cited in the file of this patent

UNITED STATES PATENTS

| | | |
|---|---|---|
| 2,025,444 | Crowe | Dec. 24, 1935 |
| 2,133,814 | Halligan | Oct. 18, 1938 |
| 2,142,658 | Saunders | Jan. 3, 1939 |
| 2,180,963 | Pearce | Nov. 21, 1939 |
| 2,221,655 | Schiffman et al. | Nov. 12, 1940 |
| 2,245,799 | McClew et al. | June 17, 1941 |